(12) United States Patent
Yu et al.

(10) Patent No.: US 9,825,707 B2
(45) Date of Patent: Nov. 21, 2017

(54) SYSTEM AND METHOD FOR COHERENT DETECTION WITH DIGITAL SIGNAL PROCESSION

(71) Applicants: ZTE (USA) Inc., Richardson, TX (US); Jianjun Yu, Basking Ridge, NJ (US); Jianqiang Li, Morristown, NJ (US); Hung-chang Chien, Rockaway, NJ (US); Zhensheng Jia, Morganville, NJ (US)

(72) Inventors: Jianjun Yu, Basking Ridge, NJ (US); Jianqiang Li, Morristown, NJ (US); Hung-Chang Chien, Rockaway, NJ (US); Zhensheng Jia, Morganville, NJ (US)

(73) Assignee: ZTE (USA) Inc., Richardson, TX (US)

( * ) Notice: Subject to any disclaimer, the term of this patent is extended or adjusted under 35 U.S.C. 154(b) by 0 days.

(21) Appl. No.: 14/377,685

(22) PCT Filed: Feb. 8, 2013

(86) PCT No.: PCT/US2013/025265
§ 371 (c)(1),
(2) Date: Aug. 8, 2014

(87) PCT Pub. No.: WO2013/119897
PCT Pub. Date: Aug. 15, 2013

(65) Prior Publication Data
US 2015/0023667 A1    Jan. 22, 2015

Related U.S. Application Data

(60) Provisional application No. 61/597,487, filed on Feb. 10, 2012.

(51) Int. Cl.
*H04B 10/2507*    (2013.01)
*H04B 1/50*    (2006.01)
(Continued)

(52) U.S. Cl.
CPC ......... *H04B 10/2507* (2013.01); *H04B 10/50* (2013.01); *H04B 10/548* (2013.01);
(Continued)

(58) Field of Classification Search
CPC   H04B 10/5053; H04B 10/506; H04B 10/548; H04B 10/556; H04B 10/5561;
(Continued)

(56) References Cited

U.S. PATENT DOCUMENTS 7,970,290 B2    6/2011   Tao et al.
2005/0271387 A1   12/2005   Kee et al.
(Continued)

FOREIGN PATENT DOCUMENTS

CN    101257349 A    9/2008
CN    101582721 A    11/2009
(Continued)

OTHER PUBLICATIONS

International Search Report for PCT/US2013/025265 dated May 30, 2013.
(Continued)

*Primary Examiner* — Leslie Pascal
(74) *Attorney, Agent, or Firm* — Drinker Biddle & Reath LLP

(57) ABSTRACT

Aspects of the present invention include apparatus and methods for transmitting and receiving signals in communication systems. A multicarrier generator generates a multicarrier signal. An optical demultiplexer separates the multicarrier signal into separate multicarrier signals. At least one QPSK modulator modulates signals from the separate multicarrier signals. An optical multiplexer combines the QPSK modulated signals into a multiplexed signal. The multiplexed signal is then transmitted.

2 Claims, 2 Drawing Sheets

200: I/Q imbalance compensation
201: electrical CD compensation
202: Resampling
203: Adaptive equalizers
204: frequency offset compensation
205: carrier phase compensation
206: 2-tap FIR post-filter
207: 2-state MLS
208: BER

(51) Int. Cl.
| | |
|---|---|
| *H04B 10/548* | (2013.01) |
| *H04L 27/26* | (2006.01) |
| *H04L 27/20* | (2006.01) |
| *H04L 25/03* | (2006.01) |
| *H04J 14/02* | (2006.01) |
| *H04B 10/50* | (2013.01) |

(52) U.S. Cl.
CPC ...... *H04L 27/2096* (2013.01); *H04L 27/2601* (2013.01); *H04L 27/2627* (2013.01); *H04L 27/2697* (2013.01); *H04J 14/0298* (2013.01); *H04L 25/03178* (2013.01); *H04L 2025/03414* (2013.01)

(58) Field of Classification Search
CPC  H04B 10/5563; H04B 10/2507; H04B 10/50; H04L 27/2601; H04L 27/2697; H04L 27/2096; H04L 27/2627; H04L 25/03178; H04L 2025/03414; H04J 14/0298
See application file for complete search history.

(56) References Cited

U.S. PATENT DOCUMENTS

| | | | |
|---|---|---|---|
| 2009/0190929 A1 | 7/2009 | Khurgin et al. | |
| 2010/0021166 A1 | 1/2010 | Way | |
| 2010/0135656 A1 | 6/2010 | Khurgin et al. | |
| 2010/0165915 A1* | 7/2010 | Kuechler | H04L 1/205 370/328 |
| 2010/0310256 A1 | 12/2010 | Shpantzer et al. | |
| 2011/0020003 A1* | 1/2011 | Yu | H04B 10/548 398/79 |
| 2011/0069975 A1 | 3/2011 | Liu et al. | |
| 2011/0243561 A1* | 10/2011 | Li | H04B 10/611 398/65 |
| 2012/0087668 A1 | 4/2012 | Li et al. | |
| 2012/0189324 A1* | 7/2012 | Mo | H04B 10/2569 398/202 |
| 2012/0224856 A1* | 9/2012 | Sato | H04B 10/516 398/79 |
| 2012/0315043 A1* | 12/2012 | Nakagawa | H04B 10/5053 398/65 |
| 2013/0322809 A1* | 12/2013 | Goh | H04B 10/5161 385/3 |
| 2015/0365174 A1* | 12/2015 | Nazarathy | H04L 25/03019 398/209 |

FOREIGN PATENT DOCUMENTS

| | | | | |
|---|---|---|---|---|
| JP | 2009-264078 | * | 11/2009 | |
| JP | WO 2011096488 A1 | * | 8/2011 | ......... H04B 10/5053 |
| WO | WO-2010145498 A1 | | 12/2010 | |
| WO | WO-2011037806 A1 | | 3/2011 | |
| WO | WO-2011073974 A1 | | 6/2011 | |

OTHER PUBLICATIONS

Supplementary European Search Report for Application No. EP 13 74 7227, dated Sep. 21, 2015.
Chinese Office Action for application No. 201380008408.7, dated Jan. 10, 2017.
Sano, A., "No-Guard-Interval Coherent Optical OFDM for 100-Gb/s Long Haul WDM Transmission", Journal of Lightwave Technology, 2009, vol. 27, No. 16, pp. 3705-3713.

* cited by examiner

SYSTEM AND METHOD FOR COHERENT DETECTION WITH DIGITAL SIGNAL PROCESSION

CROSS-REFERENCE TO RELATED APPLICATIONS

This application is a national stage application (under 35 U.S.C. §371) of PCT/US2013/25265, filed Feb. 8, 2013, which claims benefit of U.S. Application No. 61/597,487, filed Feb. 10, 2012, both of which are incorporated herein by reference in their entirety.

FIELD OF THE INVENTION

The field of the present invention is communication systems, and particularly, coherent detection with digital signal procession.

The ever increasing bandwidth demand has been driving communication systems to higher capacities. Therefore, there is a strong motivation to enhance spectral efficiency to increase the total capacity. Employing optical orthogonal frequency division multiplexing (O-OFDM) modulation to transmit signals can realize high-spectral efficiency and long distance transmission. To achieve high receiver sensitivity with coherent detection based on digital signal procession, the bandwidth of the analog to digital converter (ADC) and the sample rate may be high. Usually, the ADC bandwidth may have two times of the bit rate of the signal, and the sampling rate may be four times of the bit rate. For example, if each subcarrier of the OFDM signal is 25 Gbaud Quadrature Phase Shift Keyed (QPSK), the ADC bandwidth should be 50 GHz and the sample rate should be 100 GSa/s to obtain optimum results. However, an ADC with these specifications may not available. Therefore it would be advantageous to reduce the ADC bandwidth and sample rate while maintaining the same performance.

SUMMARY OF THE INVENTION

Aspects of the present invention employ optical orthogonal frequency division multiplexing (O-OFDM) to transmit signals realizing high-spectral efficiency over long distances.

In one aspect of the present invention include apparatus and methods for transmitting and receiving signals in communication systems. A multicarrier generator generates a multicarrier signal. An optical demultiplexer separates the multicarrier signal into separate multicarrier signals. At least one QPSK modulator modulates signals from the separate multicarrier signals. An optical multiplexer combines the QPSK modulated signals into a multiplexed signal. The multiplexed signal is then transmitted.

DETAILED DESCRIPTION OF EMBODIMENTS

Aspects of the present invention employ optical orthogonal frequency division multiplexing (O-OFDM) to transmit signals realizing high-spectral efficiency over long distances.

Figure 1:
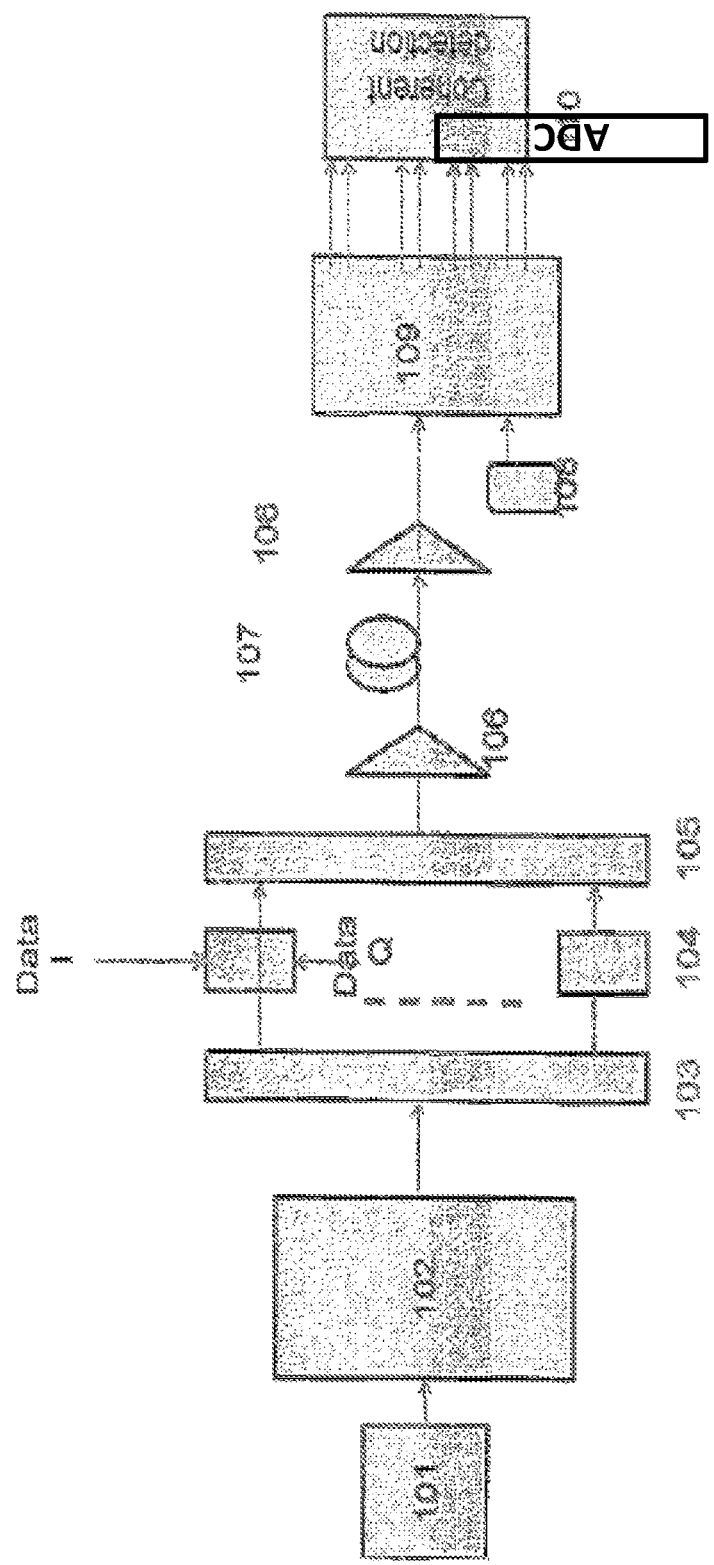
FIG. 1 illustrates a schematic diagram of a transmitter and receiver according to aspects of the present invention.

FIG. 1 illustrates a schematic diagram of a transmitter and receiver according to aspects of the present invention. A laser 101 generates a continuous lightwave. The laser 101 may be a distributed feedback type laser diode DFB-LD, which may have a wide line width. For a 100 Gbit/s QPSK, a line width smaller than 2 MHz is sufficient. Although line widths greater than 2 MHz may also be sufficient. Alternatively, the laser source 101 may be a tunable external laser with a narrow line width and low phase noise which may be preferred for high level modulation format signals. A multicarrier generator 102 receives the lightwave and generates a multicarrier signal. This multicarrier signal may be generated by a few different schemes. For example, a cascade modulator may be driven by a sinusoidal wave source and cascaded phase modulators. There may be over ten subcarriers with a frequency spacing f. To separate the optical subcarrier and, subsequently route them to different ports, an optical demultiplexer may be employed 103. This optical demultiplexer 103 may be an array waveguide grating, optical fiber Bragg grating, or other optical demultiplexer as known in the art. Each subcarrier from the respective output ports of the optical demultiplexer 103 may be modulated by using an optical I/O modulator 104. In particular, the optical I/O modulator 104 generates QPSK signals. These QPSK signals may have a non-return-to-zero or return-to-zero pulse shape. This signal may be a polarization or multiplexed signal. This optical I/O modulator 104 may be driven by four individual data (In phase Quadrature Phase for X polarization and I Q for Y polarization). The baud rate of I or Q signals may preferably be f Gbaud/s.

An optical multiplexer 105 with a 3 dB bandwidth of −f GHz combines the signals transmitted from the optical I/O modulator 104. This optical multiplexer 105 may be a regular WDM filter, a WDM coupler or array waveguide grating (AWG) or other optical filter to combine all of the channels. An optical amplifier 106 may be used to compensate any fiber loss. This optical amplifier 106 may be an Erbium doped fiber amplifier, Raman amplifier or other amplifier used to provide gain. The multiplexed signal may then be transmitted over a fiber 107. The fiber 107 may be any transmission fiber. On the receiver side, coherent detection based on digital signal procession is used. The coherent detection technique employs the use of an optical local oscillator 108, a 90 degree hybrid 109, four balanced receivers, ADC chips and ASIC chips for digital signal procession. The frequency of the optical local oscillator 108 is preferably the same as the frequency of the subcarrier. The local oscillator 108 may be a distributed feedback laser (DFB) or an external cavity laser with a linewidth preferably smaller than a few MHz. The received signal is mixed with the local oscillator (LO) signal to obtain a signal containing a plurality of phase multiplexed carriers, each of which contains an I and a Q signal. The I and Q signals are demultiplexed using 90 degree hybrid. Block 109 is the means for applying the optical LO and the 90 degree hybrid. The 90 degree hybrid may be a regular optical 90 degree hybrid to demultiplex the I and Q signal. A digital coherent detection receiver 110 includes balanced or unbalanced photodiodes, high speed ADC and other electrical components such as ASIC, FEC, and the like.

Figure 2:
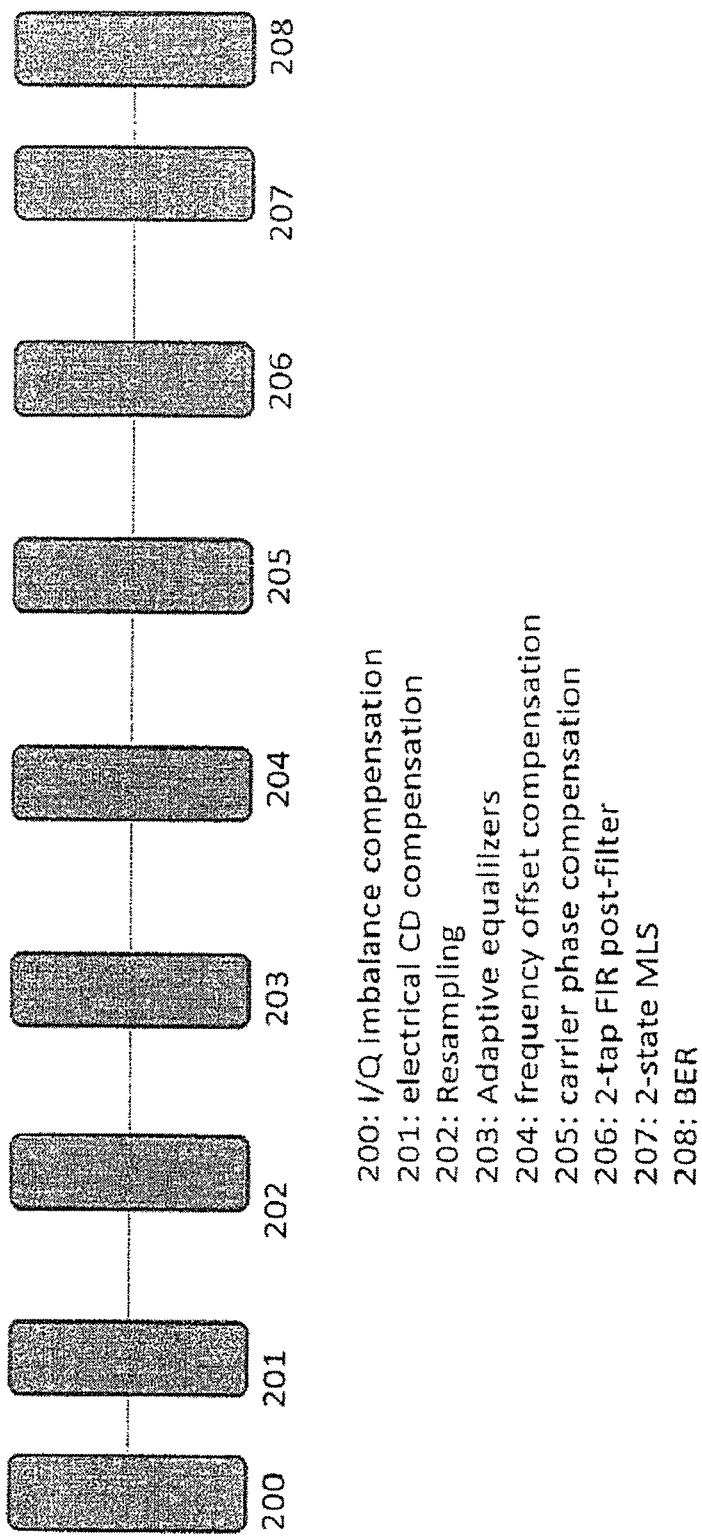
FIG. 2 illustrates a schematic diagram of digital signal procession for a coherent receiver according to aspects of the present invention.

FIG. 2 illustrates a schematic of digital signal procession (DSP) for a coherent receiver with post filter and maximum likelihood sequence estimation (MLSE). A compensation module 200 may correct an I/O imbalance of the received signal. A dispersion compensating unit 201 may compensate for chromatic dispersion. Sampling unit 202 resamples the signal. Subsequently, each bit is sampled twice. Through the use of adaptive equalizers 203, a polarization demultiplexer generates polarization demultiplexed signals. An offset module 204 compensates for a frequency offset of the demultiplexed signals in order to improve the quality of communication. Phase module 205 phase compensates the demultiplexed signal. A filter 206 post filters the phase compensated signal. The filter 206 may be a 2 tap filter. MLSE (207), which may be two state, is applied to the filtered signals, finally a bit error rate may be calculated (208).

It should be understood that the methods and devices of the present invention may be executed employing machines and apparatus including simple and complex computers. Moreover, the architecture and methods described above can be stored, in part or in full, on forms of machine-readable media. For example, the operations of the present invention could be stored on machine-readable media, such as magnetic disks or optical disks, which are accessible via a disk drive (or computer-readable medium drive). Alternatively, the logic to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only only memory (EEPROM's); and the like. Implementations of certain embodiments may further take the form of machine-implemented, including web-implemented, computer software.

While aspects of this invention have been shown and described, it will be apparent to those skilled in the art that many more modifications are possible without departing from the inventive concepts herein. The invention, therefore, is not to be restricted except in the spirit of the following claims.

What is claimed is:

1. A method for receiving signals in an optical communication system comprising:
applying, to a received multiplexed optical signal having a plurality of equally spaced subcarriers, an optical local oscillator having a frequency substantially equal to the subcarrier spacing f;
demultiplexing the subcarriers;
demultiplexing an in phase (I) signal and a quadrature phase (Q) signal from each of the subcarriers, wherein a baud rate of each of the I and Q signals is f Gbaud/s; and
coherently detecting data in the I and Q signals wherein the coherently detecting is accomplished using at least a digital signal processor (DSP) configured to:
correct an I/Q imbalance of the received signal;
compensate for chromatic dispersion;
sample and resample the signal;
generate polarization demultiplexed signals using adaptive equalizers;
compensate for a frequency offset of the demultiplexed signals;
phase compensate the demultiplexed signals;
post filter the phase compensated signal; and
apply maximum likelihood sequence estimation (MLSE) to the filtered signals.

2. An apparatus for receiving signals in an optical communication system comprising:
a 90 degree hybrid for applying, to a received multiplexed optical signal having a plurality of phase multiplexed equally spaced subcarriers, an optical local oscillator signal having a frequency substantially equal to the subcarrier spacing f;
for demultiplexing the subcarriers;
for demultiplexing an in phase (I) signal and a quadrature phase (Q) signal from each of the subcarriers, wherein a baud rate of each of the I and Q signals is f Gbaud/s;
a coherent detector for coherently detecting data contained in the I and Q signals, comprising at least: analog/digital converter(s) (ADCs) for converting the I and Q signals to digital signals, and
a digital signal processor (DSP) configured to:
correct an I/Q imbalance of the received signal;
compensate for chromatic dispersion;
sample and resample the signal;
generate polarization demultiplexed signals using adaptive equalizers;
compensate for a frequency offset of the demultiplexed signals;
phase compensate the demultiplexed signals;
post filter the phase compensated signals; and
apply maximum likelihood sequence estimation (MLSE) to the post filtered signals.

* * * * *